United States Patent
Siemens et al.

(10) Patent No.: US 10,419,369 B2
(45) Date of Patent: Sep. 17, 2019

(54) METHOD FOR OPERATING A MEMORY BUFFER SYSTEM IMPLEMENTED AT A SENDER STATION FOR THE FAST DATA TRANSPORT OVER A COMMUNICATION NETWORK, CORRESPONDINGLY ADAPTED APPARATUS TO PERFORM THE METHOD, COMPUTER PROGRAM PRODUCT, AND COMPUTER PROGRAM

(71) Applicant: HOCHSCHULE ANHALT, Koethen (DE)

(72) Inventors: Eduard Siemens, Sehnde (DE); Aleksandr Bakharev, Berlin (DE)

(73) Assignee: HOCHSCHULE ANHALT, Koethen (DE)

( * ) Notice: Subject to any disclaimer, the term of this patent is extended or adjusted under 35 U.S.C. 154(b) by 0 days.

(21) Appl. No.: 15/576,099

(22) PCT Filed: May 30, 2015

(86) PCT No.: PCT/EP2015/025029
§ 371 (c)(1),
(2) Date: Nov. 21, 2017

(87) PCT Pub. No.: WO2016/192744
PCT Pub. Date: Dec. 8, 2016

(65) Prior Publication Data
US 2018/0131639 A1    May 10, 2018

(51) Int. Cl.
*H04L 12/26* (2006.01)
*H04L 12/879* (2013.01)
(Continued)

(52) U.S. Cl.
CPC ............. *H04L 49/901* (2013.01); *H04L 1/08* (2013.01); *H04L 1/1607* (2013.01);
(Continued)

(58) Field of Classification Search
CPC combination set(s) only.
See application file for complete search history.

(56) References Cited

U.S. PATENT DOCUMENTS

2013/0019025 A1* 1/2013 Chaturvedi ....... H04L 29/06517
709/231

FOREIGN PATENT DOCUMENTS

WO   WO-03069836 A1 *  8/2003 ........... H04L 1/1628
WO   WO-2009043712 A1   4/2009

OTHER PUBLICATIONS

International Search Report and Written Opinion dated Feb. 15, 2016 for PCT Application No. PCT/EP2015/025029.

* cited by examiner

*Primary Examiner* — Chi H Pham
*Assistant Examiner* — Fahmida S Chowdhury
(74) *Attorney, Agent, or Firm* — Moser Taboada

(57) ABSTRACT

The invention relates to a method for operating a memory buffer system for the fast data transport over a communication network (30) with a reliable transport protocol working in a point-to-multipoint data transfer mode in a multi-thread environment. The invention proposes a novel meta-storage in-memory organization, which enables that concurrent memory accesses could be guaranteed without using locks, such as mutexes or semaphores. The meta-storage organization involves the use of ActiveCellsBeginDescr- and Active CellsEndDescr-descriptors and the addition of mask information (MASK) for each cell reflecting for the receiving stations (21, 22, 23) of a data transfer session in the point-to-multipoint mode, the state whether or not an acknowledgment message has been received back from the respective receiving station (21, 22, 23) for the corresponding data packet being sent over the communication network (Continued)

(30). The invention also proposes an enhanced ACK ARQ loss report method.

13 Claims, 4 Drawing Sheets

(51) Int. Cl.
  *H04L 1/18* (2006.01)
  *H04L 1/08* (2006.01)
  *H04L 1/16* (2006.01)
  *H04L 1/00* (2006.01)
(52) U.S. Cl.
  CPC ........ *H04L 1/1874* (2013.01); *H04L 43/0841* (2013.01); *H04L 43/0864* (2013.01); *H04L 43/16* (2013.01); *H04L 2001/0093* (2013.01)

| F | SN | POS | LGTH | MASK | AT |

METHOD FOR OPERATING A MEMORY BUFFER SYSTEM IMPLEMENTED AT A SENDER STATION FOR THE FAST DATA TRANSPORT OVER A COMMUNICATION NETWORK, CORRESPONDINGLY ADAPTED APPARATUS TO PERFORM THE METHOD, COMPUTER PROGRAM PRODUCT, AND COMPUTER PROGRAM

BACKGROUND

The invention relates to a method for operating a memory buffer system for the fast data transport over a communication network with a reliable transport protocol working in a point-to-multipoint data transfer mode in a multi-thread environment. Reliably here means that the data packets are positively acknowledged by the receiving station and optionally negatively acknowledged. The invention also relates to a correspondingly adapted apparatus for performing the method and a correspondingly adapted computer program product.

In high-performance network attached computer systems the implementation of data transport protocols is usually organized in a multi-threaded fashion. Hereby, the tasks of handling the sending of user data, and signaling data, the handling of receiving data and control information and the communication with a user application are assigned to different program threads or processes within the system.

Hereby, when an application starts data communication over a network system, it needs at least one thread for sending data (send handler), one thread for receiving of signaling data (receive handler) and an application thread (API-thread) that transports data between the user application and a communication protocol stack. The send handler is used to send data packets and control information to the network system. As soon as packet loss is detected, the send handler retransmits lost packets. A send buffer temporarily stores unacknowledged data, till an acknowledgment is delivered to the sender thread.

The task of the receive handler is receiving data from the network system and storing them into a receive buffer. In case of a packet loss detection, the receive handler informs the send handler, so it will send a control packet with loss data information to the sender thread of the communication pair. Since different tasks access shared data structures, those accesses must be synchronized. Conventionally, such synchronization is implemented by mutexes or semaphores.

While the send handler and the receive handler are function components, the send buffer and the receive buffer may be referred to as data components.

When the API-thread has to write data into the send buffer, it applies a mutex or a semaphore to block the simultaneously reading access from the send handler. If the send handler tries to read data from the send buffer for sending, it also applies a mutex or semaphore to prevent a simultaneous access attempt from the API-thread. The access from receive handler to receive buffer is similar to that of the send handler. Further details on the interplay of send handler-thread; receive handler-thread and API-thread are presented in WO 2009/043712 A1 where it is referred to the explanation of the background of the invention and FIG. 1 in particular.

Since a semaphore is basically the same thing as a mutex, it is referred to mutex only in the following knowing that in replacement of a mutex a semaphore may be used as an alternative. What a mutex does is e.g. explained on a corresponding Wikipedia entry. There, it is found the following definition: In short, it is the requirement of mutual exclusion. In computer science, mutual exclusion refers to the requirement of ensuring that no two concurrent processes are in their critical section at the same time; it is a basic requirement in concurrency control, to prevent race conditions. Here, a critical section refers to a period when the process accesses a shared resource, such as shared memory.

The intensive use of mutexes for thread synchronization decreases the communication software stack performance rapidly, since simultaneous access to the data, leads to wait states for process threads. Moreover, it leads to a rapid increase of the number of necessary Kernel system calls for thread synchronization.

The problem of "meta storage" organization is a non-trivial problem for data transport system designers. With "meta storage" a structured computer memory is meant, which stores important entity-related information. Under "entity", here it is understood a sent IP packet (Internet Protocol). The structure of such a meta storage which is used in this invention is designed to be used in reliable multi-Gigabit data transport protocols, working preferably in a point to multipoint fashion. One prominent example of a reliable data transport protocol which is used in the high speed data communication field, in particular over Internet is the UDT protocol, which is capable to provide a 10 Gigabit point-to-point data transmission over Internet links and features a congestion/flow control technique. UDT stands for UDP-based data transfer protocol and is primarily made for the implementation in the transport protocols which are suitable for the use in high-speed networks with data rates in the range of 10 Gbit/s. It was a pioneering technique in the industry of the high-speed data transport. The invention may however also be used in connection with the Transmission Control Protocol (TCP), but only in case of a significant protocol core adaptation due to the nature of the TCP protocol. Currently, it is not known how to implement a multi-Gigabit data transport protocol without employing a multithreaded approach. However, an essential problem of inter-thread communication is the shared access to certain areas of a computer memory. There are plenty of options existing to arrange a thread-safe access to a shared memory; however, almost all of them rely on locking of the regions of memory which are accessed concurrently from different threads. Such locks typically are implemented with mutexes and/or semaphores as above mentioned. For computer programs, a lock means the same as a traffic light at a crossroad. While one lane is in use, others must wait. This offers a great safety in conjunction with the probability of traffic jams which are avoided. It is the same for the computer system. It is not possible that a single thread makes a full time use of a buffer and prevents other threads from making use of the buffer. While it is good for a fair buffer management, locks are poison for the computer performance, since some of the arbitrating threads have to wait until the actually accessing thread unlocks the critical memory region.

In particular for the performance of a data transport protocol it may be critical since there are at least two concurring threads with which the meta-storage is accessed, one of which is a sending thread (sending user data onto to the network) and the other thread (receiving thread) is responsible for the reception of control information like ACKs be it in its general form or in the selective form SACK, and NACKs from one receiving station in case of point-to-point communication or from more than one receiving station in case of a point-to-multipoint communication and for processing of them.

It is obvious, that whenever two threads are working at the same memory area, coordination is required to avoid race conditions. Otherwise there is the danger of having conflicting memory accesses such that data which is to be read by the sending thread is already overwritten by the application thread which is delivering the data into the sending buffer or vice versa that data which is to be sent over the network is not even delivered to the buffer memory so that outdated data will be send instead.

Lock free data structures for data transport systems are proposed in prior art. Particularly, WO 2009/043712 A1 describes a memory buffer model for a data transport system, which is designed to work in a point-to-point mode.

SUMMARY

The inventors recognized that the lock free data structure as disclosed in WO 2009/043712 A1 is not appropriate for the high-speed point-to-multipoint communication mode. It is therefore an object of the invention to provide a solution with a lock-free data structure for the case of a point-to-multipoint data transmission.

Having a point-to-multipoint data transfer system means on the networking level a necessity for a more complex ARQ management scheme (at the sender site) than in case of the point-to-point mode, where a decision on buffer clean-up can be taken instantly upon reception of a confirmation for a certain data packet in the form of an ACK packet. A variant of the Automatic Repeat Request Protocol ARQ is also used in the Transmission Control Protocol to ensure reliable transmission of data over the Internet Protocol, which does not provide for a guaranteed delivery of packets.

In turn, in a point-to-multipoint data transmission mode, data can be removed from the application memory only in case if each of the plurality of receivers has confirmed the successful reception of the sent data packets. That means that normally a vector of state information is recorded per sent data packet with state information for each multipoint receiver. To make it worse, the number of receivers could become smaller during the course of data transmission. The order of accessing the buffer however is fixed in order that race conditions are avoided. That means that wait states may occur, which subjectively reduce the network communication stack performance.

It is one idea of the invention to dedicate the ACK ARQ management to be a duty of the meta-storage process. This will make the meta-storage process logically more complex, but will bring at the same time two main benefits:
1. It will subjectively reduce the load on the receiving thread in particular for ARQ processing. A performance gain can be achieved by providing for an asynchronous access of the ARQ receiver to the meta-storage (e.g. through one of the queuing techniques). Practically, it means that the receiving thread will remain to be responsible for the packet reception and copying the received packets to the buffer, but no longer for the processing of the received packets in the buffer.
2. It will enable an easy integration of a lock-free multi-threaded communication software protocol stack into an existing data transport protocol, because it is only needed to change a meta-storage model, but not a whole ARQs receiver logic.

The problem is solved by the invention by means of a method for operating a memory buffer system implemented at a sender station for the fast data transport over a communication network with a reliable transport protocol according to the claim 1 and a corresponding adapted apparatus according to claim 12 and a computer program product according to claim 13. According to the disclosed solution a novel meta-storage in-memory organization is provided, which enables that concurrent memory accesses could be guaranteed without using locks, such as mutexes or semaphores.

More in detail, in case of a point-to-multipoint data transmission, the following two problems exist:
1. The ability to serve more than one unique ACK ARQ message per packet. This is especially important to correctly pass a condition of packet removal.
2. An ACK ARQ message could be lost due to bad network conditions and the meta-storage process should offer a method to detect it since the classical timeout-based approach will not work due to the multiple receivers existence.

It is a further object of the invention to solve the handling of the metadata for meta-storage in a form such that a requirement of implementing meta-storage access lock means is avoided.

By the introduction of a receiver servicing thread which is responsible for the adding of meta-data into the meta-storage and removing of meta-data from the meta-storage this task is decoupled from the pure receive handler thread which now works independent so that it does not need to enter a wait state if the send handler thread is accessing the meta-storage.

The particular kind of meta-storage organization with an ActiveCellsBeginDescr-descriptor pointing to the beginning of the cell range in the meta-storage buffer containing the meta-data for data packets which are on their journey through the network but for which not all the acknowledge messages have been received back and with an ActiveCellsEndDescr-descriptor pointing at the end of the cell range for travelling data packets helps to make sure that no locking techniques are required. These pointers will be consulted each time the two threads want to add or remove cells to or from the meta-storage buffer, such that race conditions are avoided.

It is another idea of the invention to add a field with mask information into the cell with meta-data for a travelling packet reflecting for each of the multipoint receiving stations in the data transfer session, the state whether or not an acknowledgment message has been received back from the respective multipoint receiving station. This has the great advantage that a quick access to this mask information is possible either when the thread is handling a newly received acknowledge message or when the thread is checking if a cell can be removed from the buffer. It is advantageous if the mask information is implemented in the form of a binary mask. First, it is sufficient to register the ACK state for each receiver in a binary information item and second it can be evaluated very quickly.

To further enhance the network protocol stack performance, it is advantageous to provide in the receiver servicing thread a step of checking whether an acknowledgment message from the multipoint receivers is missing for the corresponding data packet, thereby checking if the receiver from which an acknowledgement message is missing is in an inactive state, wherein in case the missing acknowledgment message is not from an inactive receiver, declaring the data packet to be a candidate for retransmission over the communication network to the multipoint receivers. With the next retransmission request the sending thread will perform the retransmission to the receiver from which the ACK message is missing in unicast form such that the data packet finally will also be acknowledged by that receiver and the packet and its meta-data can be removed from the buffers.

It is further advantageous if for the checking if the receiver from which an acknowledge message is missing is in an inactive state the mask information of the corresponding cell in the meta storage buffer is compared with a protocol object list in which it is recorded if any one of the multipoint receivers is inactive in the current data transfer session. This way it can be avoided to wait too long for an acknowledgment from an inactive receiver which will never come. This measure therefore makes it possible to flexibly handle acknowledgment messages even if one of the multipoint receivers leaves the network which could happen in any case.

Another idea of the invention concerns the implementation of an enhanced ACK ARQ loss report process. This comprises that the checking whether an acknowledgment message is missing comprises comparing the amount of occupied cells in the meta-storage buffer (50) with a threshold value (LRST) and taking further action in the step of checking only if the amount of occupied cells in the meta-storage buffer (50) exceeds the threshold value (LRST). The use of this threshold value makes the checking operation very efficient since it suppresses unneeded operation for the case that the amount of cells in the meta-storage buffer are not existing long enough that such that the corresponding ACK packets are already expected to have been received back in a normal operation of the network communication protocol.

It is a further advantage if the threshold value is estimated at the beginning of a data transfer session such that its value is adapted to the real network characteristics of the data transfer session. An accurate algorithm for estimating the threshold value is proposed in the claims 10 to 11. This algorithm measures the actual round trip times RTT for the data transmissions from the sender to the multipoint receivers at the beginning and therefore relies on the real network characteristics.

BRIEF DESCRIPTION OF THE DRAWINGS

Following preferred embodiments of the invention are described in detail by referring to Figures. In the Figures show.

DETAILED DESCRIPTION OF THE PREFERRED EMBODIMENTS

Figure 1:
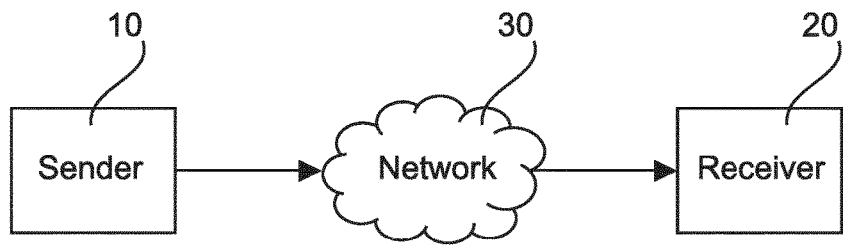
FIG. 1 a principle structure of a network in which one sending station and one receiving station in the form of standard PC's or workstations or computers in general are connected to a wide area network and are exchanging messages in the form of data packets in general.

In FIG. 1 network node 10 and network node 20 are connected to a wide area network WAN 30 and communicate via data packets, for example in an Internet environment with the reliable TCP/IP protocol. TCP here stands for the connection oriented Transmission Control Protocol and IP is the Internet Protocol.

Figure 2:
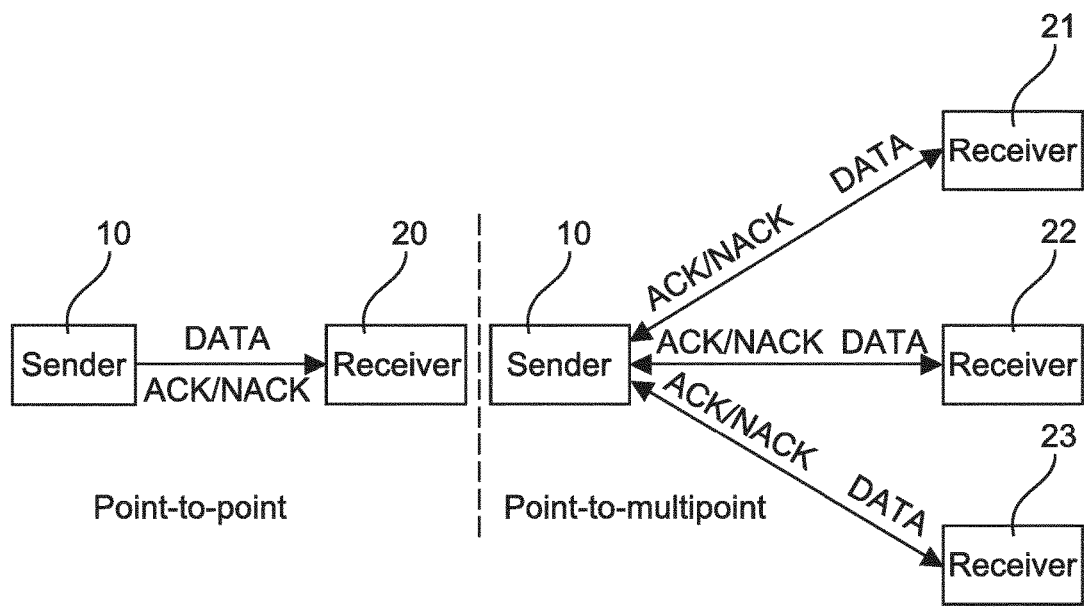
FIG. 2 a schematic representation of a point-to-point versus a point-to-multipoint data transport system.

With a reliable transport protocol such as TCP/IP the two basic communication modes are possible, point-to-point and point-to-multipoint. FIG. 2 illustrates the two modes schematically where on the left side the point-to-point communication is depicted and on the right side the point-to-multipoint communication. Since multiple receiving stations are involved in the point-to-multipoint communication mode, it is required that a positive acknowledge message needs to be received back from each of the multipoint receiving stations before a data packet can be removed from the sending buffer. It may be that a packet is lost on the transfer path and thus after a timeout set in the TCP protocol such missing packet needs to be retransmitted to the receiving station. That's why the TCP protocol is considered to be a reliable transport protocol. It is obvious that the handling of ACK/NACK messages is subjectively complicated in the point-to-multipoint mode.

Figure 3:
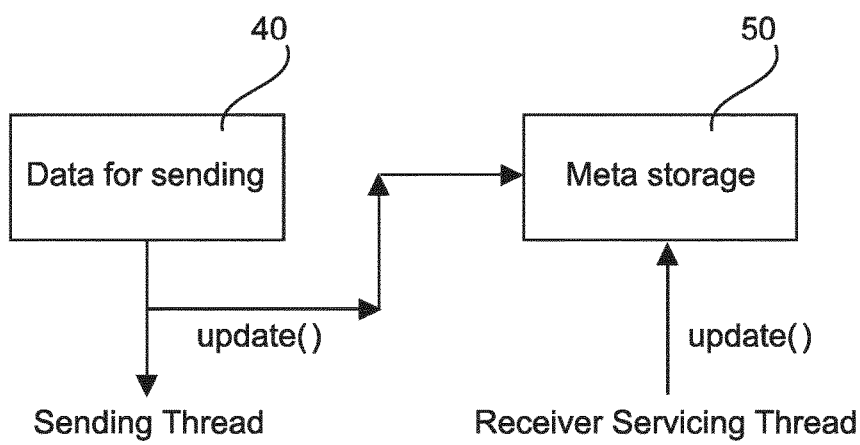
FIG. 3 a schematic representation of the conception of meta-storage for a data transport system.
Figures 4, 5:
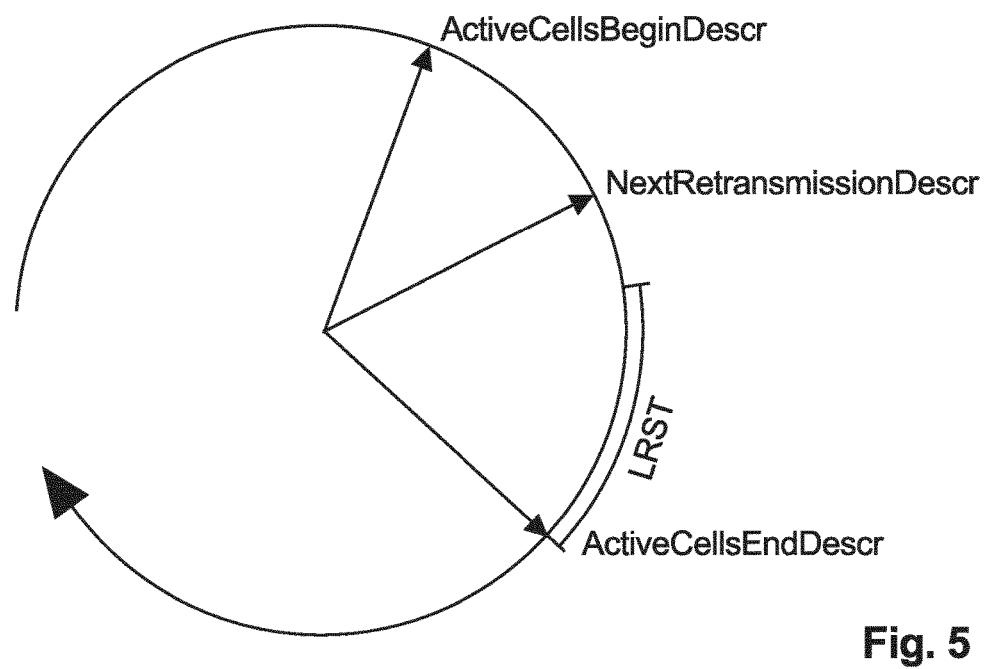
FIG. 4 the format of a cell in the meta-storage buffer.
FIG. 5 a schematic representation of a meta-storage organization.

As shown in FIG. 3, the packet sending thread is a thread which gets data from a data pool implemented as a send buffer 40 in the form of a circular buffer, also called Token buffer, assembles it into a data packet, creates an entry about this data packet at the meta-storage buffer 50 and sends it. The receiver servicing thread 90 in turn waits for a packet confirmation and removes the entry from meta-storage buffer 50 as well as the data from the "data for sending" memory area of the sending buffer 40. In order to solve above mentioned problems, the meta-storage buffer 50 will be organized in form of a circular buffer with enhanced functionality on the matter of each update operation management. A "descriptor" will be used for that purpose, which represents the position of a certain cell at the meta-storage buffer 50. Meta-storage buffer 50 is to be organized in form of a circular (ring) buffer, which consists of a sufficient amount of cells plus some safety margin such that overflow is avoided. The format of a meta-storage buffer cell is depicted in FIG. 4. A cell comprises fields for the following information items:
1. A flag F, that indicates a current cell status: free or busy
2. A sequence number SN of the data packet, for which this cell stores meta information
3. All the Meta-data of the packet—is considered to store the protocol-dependent parameters of each packet, but at the most common case:
   1. A position information POS of a packet payload at the send buffer 40
   2. An information LGTH about the Size of the packet payload
4. A binary mask MASK, which represents for each multipoint receiver 21, 22, 23 the following data: for mask 101—it means the receivers 21 and 23 have positively confirmed the packet reception. The length of the mask is to be defined within the initialization of the protocol stack. For three receivers only a 3 bit mask is needed but in practice it is reasonable to make the binary mask wider in order to extend protocol flexibility for the certain use case, which of course has the price of a small software stack overhead.

5. Information about the time AT, when this cell was accessed for any kind of interaction at last time (is needed for a proper ACK ARQ loss management, i.e. the retransmission timer will make access to this piece of information).

The amount of such meta-storage cells (and consequently the physical size of the meta-storage buffer 50) is to be calcufated using the following formula:

$$MetaStorageSize = \frac{SendBufferSize}{MaxPayloadSize} + CorrectionCoef$$

where, SendBufferSize is the size of the data pool in bytes which are to be sent in one session;

MaxPayloadSize is a maximum allowed size of the packet payload in bytes within the session; this value is normally derived from the maximum transmission unit value MTU by deducting all the packet headers which are encapsulated in the Ethernet packet;

CorrectionCoef is a safety gap to avoid a storage overflow—this value could vary, depending on the use case. Such an overflow may theoretically appear if the sending station 10 will start to generate an enormous amount of packets with a size less than the MaxPayloadSize.

Therefore, we have a meta-storage structure which consists of so many cells as calculated in the MetaStorageSize parameter. The cells are of the pre-defined type and for managing the meta-storage three independent descriptors are used, which are at the places depicted in FIG. 5.

1. An ActiveCellsBeginDescr—descriptor, which represents the beginning of the cells range, in which the cells are at a "busy" status meaning that the packets corresponding to these cells have been sent but are not finally removed from the send buffer 40 because they are not yet positively acknowledged or they are negatively acknowledged and await retransmission
2. An ActiveCellsEndDescr—descriptor, which represents the end of the cells range, which are at "busy" state
3. A NextRetramsissionDescr—descriptor, pointing to the most expected cell position to which its corresponding packet is expected to be retransmitted at the next retransmission request. It makes sense to maintain this descriptor because of the bursty nature of the data communication over a wide area network WAN.

In the easiest case these descriptors can be implemented in the form of pointers which point to the respective cell in the buffer. This basically means, that the only range which is interesting for the invention in terms of control information reception is in the cell range between ActiveCellsBeginDescr-descriptor and ActiveCellsEndDescr-descriptor because it clearly represents the packets, which are in-flow and are awaiting some action. At the moment of a new packet creation, a new cell is to be filled with certain meta-data, and the working area, in such case, begins at the ActiveCellsEndDescr-descriptor and ends at the ActiveCellsBeginDescr-descriptor. It is noted that the direction in which the cell number increases is also indicated in FIG. 5. The ActiveCellsEndDescr-descriptor will be shifted when a new cell is filled. For the case a packet has been positively acknowledged, the corresponding cell in the meta-storage buffer will be removed which simply will be done by shifting the ActiveCellBeginDescr-descriptor. This is the basic principle of how meta-storage is protected in case of two concurrent update calls because areas, which are subject for concurrent update calls are strictly isolated from each other and a race condition will never appear when the Begin-descriptor is always checked before a new cell is filled. Note, that each cell filling implies that the new cell will be filled outside of the interval [ActiveCellBeginDescr; ActiveCellEndDescr]—the interval, where the multipleIncrement( )-method is allowed to work. This method will be explained below. Moreover, in the process of cell filling first the cell will be filled and only when it is filled, the ActiveCellEndDescr-descriptor will be moved to the next position. Here, the shifting of the ActiveCellsEndDescr-descriptor will be performed by the sending thread 70 and the shifting of the ActiveCellBeginDescr-descriptor as well as the NextRetramsissionDescr-descriptor will be performed by the receiver servicing thread 90. The difference to the point-to-point approach is in the particular logics, which moves the ActiveCellsBeginDescr-descriptor (removes data). This will be evident from the detailed description of the multipleIncrement( )-method which follows.

Figure 6:
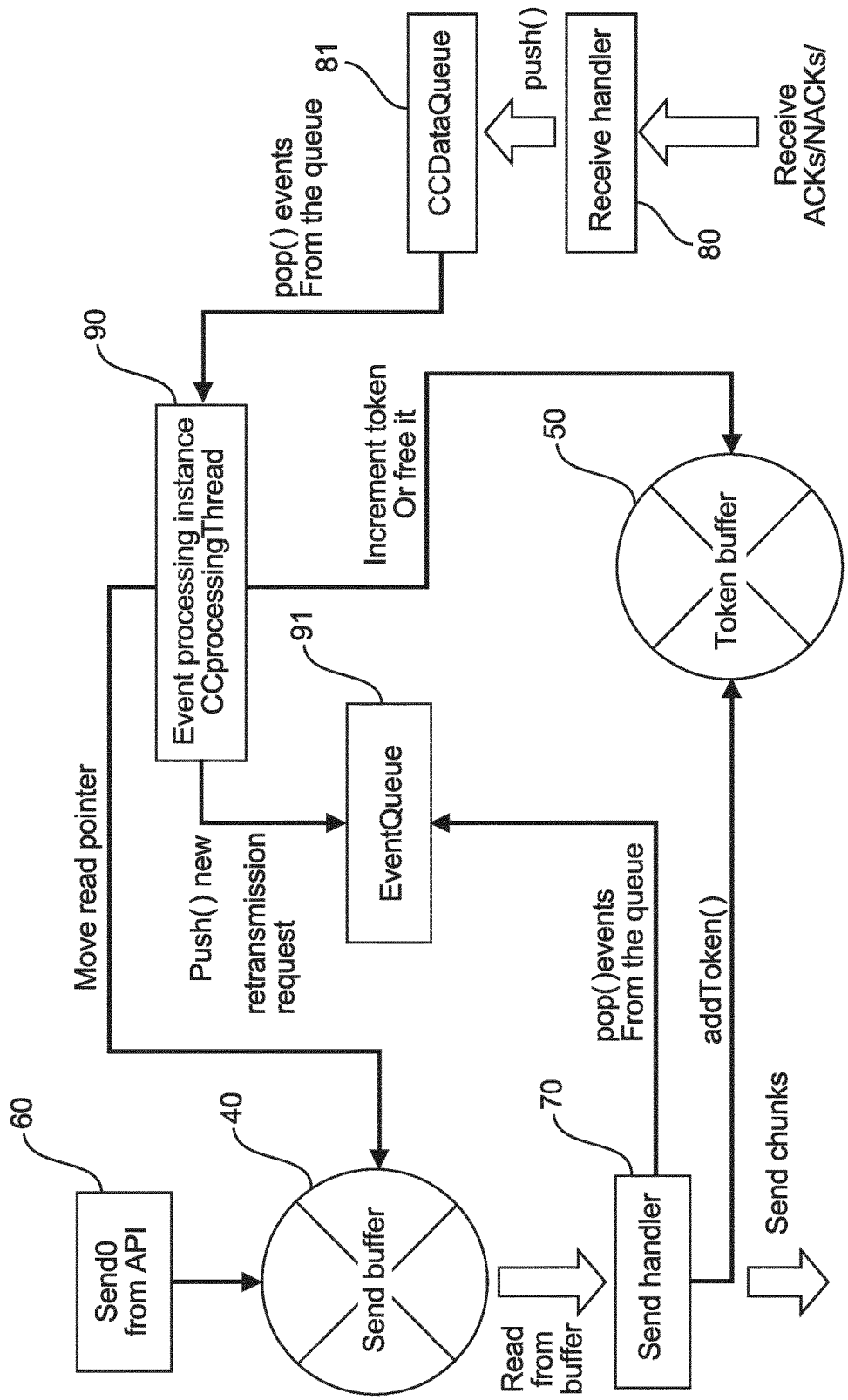
FIG. 6 the interworking of a plurality of threads which are active in the sending device for the transport of data to a plurality of receiving devices.

Before explaining in detail the process for removing a packet from the sending buffer 40, the program structure of the whole packet to memory framework present in the sending station 10 will be explained with the help of FIG. 6. The sending buffer 40 has the same reference number as in FIG. 3. The meta-storage 50 from FIG. 3 is implemented in the form of a circular Token buffer which likewise has the same reference number 50. Different threads working in the frame-work are depicted with different colors. There is a Send( ) from API-thread which fills the sending buffer 40 with data to be sent. The data sections which flow into the sending buffer 40 come from an streaming application, e.g. a video streaming application. There are plenty of video player software solutions on the market, e.g. the VLC player.

With the sending buffer 40 is also working the sending thread 70. This thread is responsible for the sending of packets to the multipoint receiver group. It basically takes the data from the send buffer 40 assembles it into a data packet, creates an entry about this data packet at the Token buffer 50 by adding a Token to the buffer and sends the packet over the network. Thus it can do two sorts of actions with the Token buffer 50:

Creation of a new Token in case if a new packet is to be created

Looking up for an existing Token in case of a requested retransmission.

A receiving thread 80 is also active in the sending station 10. It will deal with the ACK/NACK messages coming back from the receiving stations 21, 22, 23. This thread 80 is pushing the received packets into a CCDataQueue 81. The queue is needed for buffering the ACK and NACK packets before being handled with the event processing thread 90. It is a lock-free FIFO queue. The term "lock-free" means, that the element can be pushed and popped without needing mutexes or semaphores. There, the received packets await handling by the event processing thread 90. Note, that the event processing thread 90 corresponds to the receiver servicing thread which is depicted in FIG. 3.

The event processing thread 90 is responsible for processing of ACK/NACK messages queued in the CCDataQueue 81. In particular, in case of an ACK message, it will have to increment an existing "Token counter" for the confirmed packet and initiate a send buffer cleaning operation via the Move read pointer path if needed. This counter may be hold in the protocol software stack and counts the amount of unique acknowledgements for the certain packet. The term counter may be a bit misleading here, since in the disclosed embodiment the binary mask fulfills the job of the token counter pretty well. So incrementing the counter here is equivalent to updating the mask information in the meta storage cell. As soon as the counter equals the amount of receivers in the multicast group, the packet can be deleted from the send buffer 40 and the token in the token buffer 50 may be freed, too. It is needed when all of the multipoint receivers 21, 22, 23 have acknowledged the packet and the meta-data for this packet is in the cell to which the Active-CellBeginDescr-descriptor points.

In the event processing thread 90 the following methods will be called:

1. A method, which will process ARQ message receptions which may acknowledge a single packet with sequence number SN or a plurality of data packets with sequence numbers in a range [SN1, SN2]. This method is responsible for incrementing the ACK counter of the certain packet or range of packets. In case the last ACK for the packet has been received, this method will declare the corresponding packet to be a candidate for a packet removal. This method is named multipleIncrement( )-method and its execution will cause a move of the ActiveCellsBeginDescr-descriptor. This way the packet will be declared to be a removal candidate. The characteristic to be a removal candidate is a property of the whole Meta storage. There is one and only one removal candidate in this meta-storage process.
2. A method, which will take care of the proper detection of ACK ARQ losses—getAckLosses( )-method.

Figure 7:
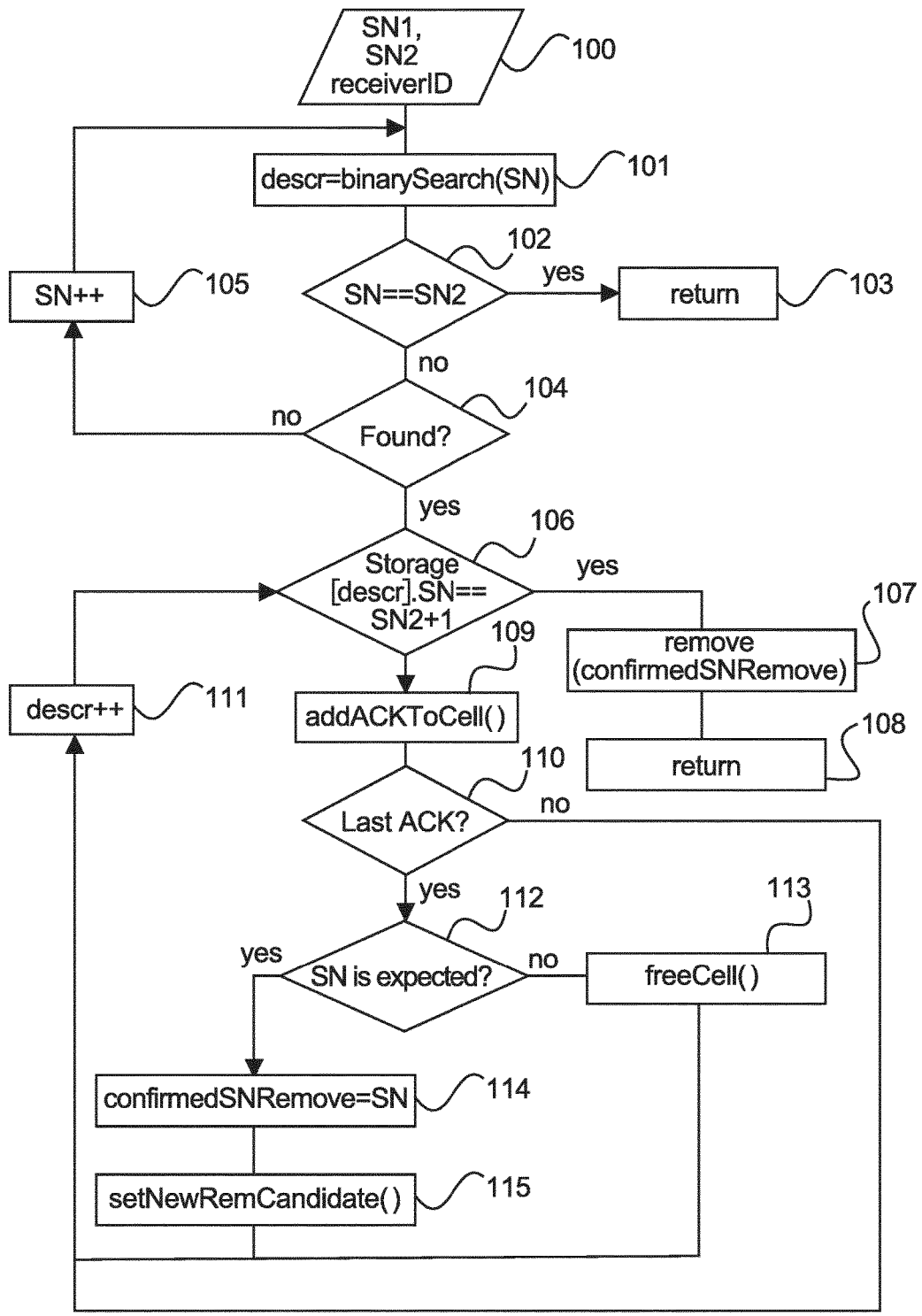
FIG. 7 a flow chart of an multipleIncrement( )-method which is called in the event processing thread working in the sending station which is responsible for the processing of acknowledge messages from the multipoint receiving stations.

The logics of the multipleIncrement( )-method is illustrated in the flow chart shown in FIG. 7. The program starts in step 100. Three parameters are handed over upon call-up of this thread 90. SN1—the first sequence number at the acknowledged range, SN2—the last sequence number at the acknowledge range, and receiverId—an internal identifier number of the recipient from which the ACK message is coming which is to be handled by the thread 90.

The following explains how a packet removal from the send buffer 40 is to be performed according to the invention. As soon as an ARQ message has been received, it has to be processed for meta-storage. Each ARQ message contains a sequence number or a range of it, it reports as received or lost. It is considered here an ACK ARQ message—a positive acknowledgement of the received packet, because this is the only condition to make a decision about a packet removal. The proposed algorithm, relies on the fact that each receiver at the session has its own internal protocol-wide ID number, which is not an IP address but an internal unique identifier (constant in time) of each receiver inside the data transmission session (just an unsigned integer). In one embodiment a 32 bit unsigned integer number is used and considered to be sufficient for that purpose. This is one example, other examples are possible. If e.g. in another embodiment a globally unique ID number is used, then a 64 bit unsigned integer number can be used for that purpose. The multipleIncrement( )-method gets the following data in step 100 to start working:

1. Sequence number SN (or sequence number range [SN1, SN2]) to work with
2. ID number of the receiver station 21, 22, 23, which sent the respective ACK message.

As soon as this data SN1, SN2 and receiverID is passed to the algorithm, the algorithm will have to find a cell in the Token buffer 50, in which the corresponding packet information has been stored. Since the distance between the descriptors ActiveCellsBeginDescr and ActiveCellsEndDescr can be pretty big in case of a multi Gigabit data transfer (it could be hundreds thousands of cells), in a preferred embodiment of the invention a binary search for searching a proper cell to start with is performed. It is safe to use this search algorithm, since the data at the meta-storage 50 is guaranteed to be sorted in the order of increasing sequence numbers. This search is performed in step 101 of the flow chart in FIG. 7. In step 102 it is checked if the end of the sequence number range SN2 has been reached. If yes, the handling of the ACK ARQ message is completed and the method ends with a return to the event processing thread 90 in step 103.

Whether the search has found the cell with the binary search is checked in step 104. If not, the sequence number SN is incremented in step 105 and the program returns to step 101. If a cell for the respective sequence number and receiverID has been found in checking step 104 (it could be that it will not be found in the whole search range or just for part of it, in case of the occurrence of the duplication of an ACK message), the present ACK event has to be added to the mentioned binary mask MASK of that cell in step 109. Such an ACK duplication may occur in two cases:

1) An ARQ loss was wrongly detected at the sender site—it will initiate a retransmission for the certain packet and in case of wrong loss detection, this may lead to the situation when two similar ACKs will come after some time.
2) The receiver side also has a mechanism, which will request a retransmission if some of per NACK message negatively acknowledged data packets are not delivered after a certain timeout period. This also may lead to the ACK duplication in specific cases.

It means that the corresponding bit of the mask has to be filled with the entry "1" for acknowledgement received. In step 110 it will be checked if that was the last ACK which needs to be entered for this receiver or if more ACKs are awaited. The check will be performed by reading the mask of the cell and the mask has to be compared with one, which is stored at the global protocol objects-list of the receivers, which are active now. This object is preferably stored in a heap of the protocol stack runtime as well as other components. In that mask a receiver is signaled to be active in the session if any ACK/NACK message from that receiver has been received in the session. Therefore, if only some of the ACK messages are missing from that receiver the state in the global protocol object list will not be set to "0". Thus the receiver in the protocol objects-list will still be indicated as an active receiver. The protocol objects-list is an independent object maintained and controlled by the Send Handler thread. In practice, it means that the Send Handler may initiate a receiver disconnection. And in the method for the receiver disconnection, there is one step which is cleaning-up the protocol objects-list. If both masks are found to be equal in step 110, it was the last ACK for the packet and the packet may be considered as a candidate for a packet removal. The checking of the masks equality is done in step 110 using the XOR (exclusive OR) operator. The result of that operation is entered in the following table for an example:

| Cell's binary mask | Current active receivers mask | Result (boolean) | Action |
|---|---|---|---|
| 10110 | 10111 | 1 | keep active |
| 10111 | 10111 | 0 | remove |

The decision to perform a packet removal from send buffer 40 in this embodiment will be made based on the fact, whether the ACK message was expected for the SN number or not. This is checked in step 112. This is done by comparing the first sequence number SN1 of the acknowledged range with the expected one, which is tracked in the token buffer 50. The detailed process how to determine if a packet is expected or not will be explained hereinafter in detail when the ARQ loss report algorithm will be described. If the acknowledged packet was not expected, the cell will be marked as free in step 113, but the ActiveCellsBeginDescr-descriptor will not be moved yet. Those cells marked as free will be handled at step 115, when the method finally gets an expected sequence number. As soon an ACK of an expected sequence number is processed, the algorithm will skip all the previously confirmed cells and set a new remove candidate to the position of the expected sequence number. And as soon, as a whole SN range is traversed, the ActiveCellsBeginDescr will be moved a corresponding plurality of positions forward in the step 107. And this is one of the key features—independent on the token buffer state and the SN number range, the ActiveCellsBeginDescr-descriptor will be moved only ones per multipleInrement( )-method call.

If yes, it will be confirmed to be ready for a packet removal in step 114 and a corresponding entry is made in a list of candidates for packet removals in step 115. In step 111 then the SN number will be incremented and it will be checked in step 106 if the incremented SN number is equal to SN2+1. If not, the cell for that incremented sequence number will be searched in step 106. For this search there is no need to perform a binary search since that cell should be pretty close to the first found cell due to the data transmission nature. The entry of the ACK event for the receiver into the mask of the found cell will likewise be entered as before. When all the ACKs for this receiver have been entered into the cell masks in this way after the loop has run through multiple times, the check in step 106 finally branches to step 107 in which the packet removal for all confirmed cells is performed. Here the ActiveCellsBeginDescr is moved several times for the confirmed removals registered in the list of confirmed removals and in addition these cells in the Token buffer 50 will be set to the "Free" state in the flag field F. After that the multipleIncrement( )-method returns to the event processing thread 90 in step 108.

What is important to note is that the remove call to the send buffer 40 will be initiated either one or zero times during processing of an ACK event. So, the ActiveCellsBeginDescr-descriptor can only be moved by the event processing thread 90, while the ActiveCellsEndDescr-descriptor can only be moved by the sending thread 70, which creates and send packets.

Real computer networks always have impairments, such that packet losses may occur. It cannot be guaranteed that all the data will be delivered continuously. Since any reliable protocol has its own scheme of user data retransmissions using NACK ARQ messages or others, the challenging decision is how to ensure that ACK ARQ messages are delivered reliably. The decision should be made as fast as possible, since at high data rates in the range of GBits/s buffer growth can rapidly cause its overflow in a very short time, since a lost ACK message means that the corresponding packet will not be removed from the sending buffer and therefore all the place beginning from this packet payload will become unavailable for further work.

The invention addresses this issue for a multicast data transport system by introducing a new metric called "Loss Report Silence Threshold" (LRST). In fact, LRST is the amount of packets in the flow, from which ACK messages should be there within normal protocol operation, in other words which are expected. FIG. 5 illustrates an example LRST value and which range it covers in the meta-storage buffer 50 beginning from the ActiveCellsEndDescr-descriptor. This meta-storage parameter is to be obtained at the very beginning of the data transfer session through the following procedure:

1. The sender initiates connections with all receivers involved in the session
2. As soon as the handshake procedure is finished, the sender initiates a RTT (round trip time) measurement session between it and each of the receivers in a unicast fashion—therefore N RTT values measured in milliseconds are to be obtained.
3. The sender chooses the highest measured RTT value of the session
4. The sender calculates the LRST value for the session. In another embodiment the LRST value can be adjustable for multi-path networks during the session. In the preferred embodiment the LRST value will be calculated at the beginning of the session in the following way:

$$LRST = \left( \frac{DataRate * 1E6}{PacketSize * 8} \bigg/ \frac{1E3}{RTT} \right) + B,$$

where
DataRate—is the maximum sending data rate [Mbit/s]
PacketSize—is the maximum packet size [bytes]
RTT—is the highest measured RTT value chosen at step 3 in [ms]
B—is a correction coefficient which is only needed because of additional delays are inserted depending on the software/hardware design, the protocol implementation is running in. For example due to system timer inaccuracies, delays in system calls execution and finally the protocol implementation itself such delays may be caused. In worst case, all these factors may cause a slower packet processing and therefore are a reason for an additional buffer growth. In the preferred embodiment of the invention the base value B is to be calculated using the following formula:

$$B = \left( \frac{DataRate * 1E6}{PacketSize * 8} \bigg/ \frac{1E3}{RTT} \right) * 0.5.$$

So, in general, an LRST value of 50% of the packets in fly is a sort of balance point for both high and low data rates. However, this LRST parameter is a subject for a deep algorithm tuning for each particular case and may significantly move protocol performance forward by a faster stack operation. The LRST value will be used in step 112 of FIG. 6 for checking if the data packet was expected or not.

As soon as the LRST value is calculated it will be controlled whether it makes any sense to check the meta-storage in the form of the Token buffer 50 for ACK losses. As long as if (ActiveCellsEndDescr—ActiveCellsBeginDescr)<LRST—there is definitely no sense to check for ACK losses, and in the opposite case—it is required to check for ACK losses using a so-called getAckLosses( )-method, which is simply doing following: It iterates through all the interval between the cells from ActiveCellsBeginDescr-descriptor and ActiveCellsEndDescr-descriptor in order to find whether any packet was last time acknowledged at a time, which was longer than set in the parameter ACK_

LOSS_THRESHOLD [nsec] ago from the current time. Now, if such packets are existing, the getACKLosses( )-method gets the information about the missed receivers by checking the binary mask of those cells. An example:
1. The cell for a packet was last time updated at SOME TIME which is too far in the past. The last update time is recorded in the AT field of the cell.
2. The cell's binary mask is 10111.
3. We know the current status for all receivers at the session from the global active receivers mask and can easily retrieve it. Say it is—11111.
4. Taking into account this known fact it is obvious that the receiver with ID 2 should send the ACK message for the packet from the current cell one more time. In consequence the sender will invoke a unicast retransmission of the packet, the current cell refers to. And this action will force the receiver to acknowledge the received packet. This way, the sender 10 will finally get the acknowledgment message it is waiting for.

There are two scenarios when retransmissions are invoked:

Upon NACK reception: A retransmission task will be created at the event processing thread 90 for the packet with the certain sequence number and passed to the send handler. The Send handler will make a TokenBuffer lookup for the certain sequenceNumber and if it is found, a retransmission will be done, since the send handler already knows the information about the packet position in memory from the pointer.

Within getACKLosses( )method: This will be called from the event processing thread 90. If the ACK losses detected, event processor will create a retransmission task.

An important point is that the getACKLosses( )-method must be performed in between the processing of two consecutive ARQ messages by the thread. This way the data consistency at the meta-storage 50 can be guaranteed.

As explained already above, the logics of the sending thread 70 is much easier. On the token creation, it just tries to update the nearest cell in a "FREE" status. If it is available, everything is ok. If not, an update method will return an error code.

Upon getting a retransmission request from the event processing thread 90, it will look the existing token up and retrieve the needed information about the packet to be retransmitted (position in buffer and payload size). If the token is found, it will return "0", if not, an error code will be returned.

The features of the invention as disclosed in the above description, in the claims and in the drawings may be of importance for the implementation of the various embodiments of the invention both individually and in any desired combination.

The invention claimed is:

1. A method for operating a memory buffer system implemented at a sender station connectable to a communication network for fast data transport over the communication network with a reliable transport protocol working in a point-to-multipoint data transfer mode,
  wherein the memory buffer system comprises a send buffer comprising data cells in which data units ready to be sent over the communication network are stored, and in which the data units which have been sent over the communication network with corresponding data packets but not being completely acknowledged by receiving stations of said point-to-multipoint data communication mode are stored, and
  wherein the memory buffer system further comprises a meta-storage buffer comprising cells in which meta-data for the data packets which have been sent over the communication network but not being completely acknowledged are stored,
  the method comprising:
    with a sending thread, adding the meta-data for a sent data packet into a next free cell of the meta-storage buffer, thereby shifting a first descriptor (ActiveCellsEndDescr) pointing to the end of the occupied cells range in the meta-storage forward;
    with a receiver servicing thread removing a cell from a range of the occupied cells in the meta-storage buffer if the corresponding data packet has been completely acknowledged by all active receiving stations in the point-to-multipoint communication mode, thereby shifting forward a second descriptor (ActiveCellsBeginDescr) pointing to the beginning of the occupied cells range in the meta-storage; and
    in the receiver servicing thread, checking whether an acknowledgment message from the receiving stations is missing for the corresponding data packet thereby checking if a receiving station from which an acknowledgement message is missing is in an inactive state, wherein in case the missing acknowledgment message is not from an inactive receiving station, declaring the data packet to be a candidate for retransmission over the communication network to at least the multipoint receiving station from which the acknowledgment message is missing.

2. Method according to claim 1, wherein the occupied cells in the meta-storage buffer comprise a field with mask information reflecting for each of the receiving stations of a data transfer session in the point-to-multipoint mode, the state whether or not an acknowledgment message has been received back from the respective receiving station for the corresponding data packet being sent over the communication network.

3. Method according to claim 2, further comprising, after receiving an acknowledge message from a receiving station, updating said mask information in the occupied cell for the corresponding sent data packet by the receiver servicing thread.

4. Method according to claim 2, wherein the receiver servicing thread comprises checking the entries in the field with mask information, whereby the cell will be declared to be allowed to be removed in the removal process if the mask information reflects that the acknowledgment messages for the corresponding data packet have been received from all active receivers involved in the point-to-multipoint communication mode.

5. Method according to claim 2, wherein said mask information is implemented in the form of a binary mask with a binary information item for each of the participating receiving stations in said point-to-multipoint communication mode.

6. Method according to claim 1, wherein checking for an inactive receiving station involves comparing the mask information of the corresponding cell in the meta storage buffer with a protocol object list in which it is recorded if any one of the multipoint receiving stations is inactive in the current data transfer session.

7. Method according to claim 1, wherein the checking whether acknowledgment messages are missing comprises comparing the amount of occupied cells in the meta-storage buffer with a threshold value and taking further action in the step of checking only if the amount of occupied cells in the meta-storage buffer exceeds the threshold value.

8. Method according to claim 7, wherein the threshold value is estimated at the beginning of a data transfer session.

9. Method according to claim 8, wherein estimating the threshold value comprises:

measuring the round trip time values RTT in milliseconds between the sending station and any one of the multi-point receiver stations;

selecting the highest round trip time value RTT measured in the previous step; and calculating the threshold value LRST according to the formula:

$$LRST = \left\{ \frac{DataRate * 1E6}{PacketSize * 8} \bigg/ \frac{1E3}{RTT} \right\} + B$$

where

DataRate—is the maximum sending data rate in [Mbit/s]

PacketSize—is the maximum packet size in [bytes]

RTT—is the highest measured RTT value selected in the step before in [ms]

B—is a correction coefficient.

10. Method according to claim 9, wherein the correction coefficient B is calculated according to the formula:

$$B = \left\{ \frac{DataRate * 1E6}{PacketSize * 8} \bigg/ \frac{1E3}{RTT} \right\} * 0.5$$

with the DataRate, PacketSize and RTT value being the same as defined in claim 9.

11. Method according to claim 1, further comprising maintaining a third descriptor (NextRetransmissionDescr) pointing to the next most expected position of a cell which contains the meta-data of the data packet stored in the send buffer which is expected to be retransmitted at the next retransmission request.

12. Apparatus adapted to perform the method according to claim 1.

13. Computer program product having stored thereon program code which when run in a computing system performs the method according to claim 1.

* * * * *